United States Patent [19]

Ozaki et al.

[11] Patent Number: 5,765,976

[45] Date of Patent: Jun. 16, 1998

[54] METHOD OF CONTROLLING THE NORMAL DIRECTION OF THE MAIN SHAFT OF THE NUMERICAL CONTROL MACHINE TOOL

[75] Inventors: Yasuo Ozaki; Tomoo Hayashi; Takahiro Funaki, all of Shizuoka-ken, Japan

[73] Assignee: Toshiba Kikai Kabushiki Kaisha, Tokyo, Japan

[21] Appl. No.: 553,764

[22] Filed: Oct. 23, 1995

[30] Foreign Application Priority Data

Oct. 24, 1994 [JP] Japan .................. 6-258487

[51] Int. Cl.$^6$ ............................................. B23D 1/00
[52] U.S. Cl. .................. 409/293; 318/573; 364/474.28; 409/289; 409/315; 409/317; 409/348
[58] Field of Search ................. 364/474.17, 474.18, 364/474.28, 474.29, 474.31, 474.32; 409/79, 80, 84, 215, 131, 132, 204, 289, 293, 315, 317; 318/568.22, 572, 573, 574

[56] References Cited

U.S. PATENT DOCUMENTS

| | | | |
|---|---|---|---|
| 2,090,507 | 8/1937 | Zimmerman | 409/348 |
| 2,727,438 | 12/1955 | Gack | 409/348 |
| 3,753,385 | 8/1973 | Zarlengo | 409/345 |
| 3,970,830 | 7/1976 | White et al. | 364/474.29 |
| 4,516,211 | 5/1985 | Nozawa et al. | 364/474.31 |
| 4,572,998 | 2/1986 | Nozawa et al. | 318/572 |
| 5,178,498 | 1/1993 | Bieg | 409/132 |
| 5,363,309 | 11/1994 | Tong Loh | 318/573 |

FOREIGN PATENT DOCUMENTS

| | | | |
|---|---|---|---|
| 1227309 | 10/1966 | Germany | 409/345 |
| 1033106 | 4/1963 | United Kingdom | 409/345 |

*Primary Examiner*—A. L. Pitts
*Assistant Examiner*—Christopher Kirkman
*Attorney, Agent, or Firm*—Finnegan, Henderson, Farabow, Garrett & Dunner, L.L.P.

[57] ABSTRACT

A tool T is mounted to the tip of the rotatable main shaft S, and at least the rotation angle of the main shaft S is controlled so that the edge of the tool T is always maintained at the right angle against the direction of the tool movement on the machining program locus, when a work W is machined with the edge $T_A$ of the tool T in the state that the edge $T_A$ of the tool T is offset from the rotation center $S_O$ of the main shaft S.

2 Claims, 8 Drawing Sheets

METHOD OF CONTROLLING THE NORMAL DIRECTION OF THE MAIN SHAFT OF THE NUMERICAL CONTROL MACHINE TOOL

BACKGROUND OF THE INVENTION

1. Field of the Invention

The present invention relates to a method of controlling the normal direction of the main shaft of the numerical control machine tool to maintain always the edge of the tool in the direction of the right angle against the direction of the tool movement on the machining program locus, when a work is machined with a tool attached to the tip of the main shaft.

2. Description of the Related Art

Conventionally in the numerical control machine tools, when a work is machined with a tool attached to the tip of the main shaft, there is known generally a method of controlling the normal direction of the main shaft to maintain always the edge of tool in the direction of the right angle against the direction of the tool movement on the machining program locus.

In the method of controlling the normal direction of the main shaft in this case, since the center of the main shaft and the center of the edge of the tool coincide with each other, the edge of the tool is controlled to be at the right angle to the direction of the tool movement on the machining program locus always only with respect to linear interpolation and arc interpolation.

In the conventional method of controlling the normal direction of the main shaft described above, however, since it is provided only the control function in the state that the center of the main shaft and the center of the tool coincide with each other, the controlling the normal direction of the main shaft is able to execute only with respect to linear interpolation and arc interpolation, therefore there is a problem that when the center of the main shaft and the center of the edge of the tool is offset, the controlling of the normal direction of the main shaft is not possible to execute accurately.

There is also a problem that the controlling of the normal direction of the main shaft is not possible to execute accurately in the inside of the corner in the machining program locus.

Therefore, when the edge of the tool is offset against the center of the main shaft, the operator has to calculate for various corrections to control the normal direction of the main shaft corresponding each case that is very time-consuming and very troublesome.

SUMMARY OF THE INVENTION

The object of the present invention, therefore, is to provide a method of controlling the normal direction of the main shaft of the numerical control machine tool in which when a work is machined with the edge of the tool, the edge of the tool is controlled to be maintained at the right angle against the direction of the tool movement on the machining program locus so that it is possible to machine easily, as well as to obtain a certain face accuracy, even if the edge of the tool is offset against the rotation center of the main shaft, and the operator does not have to consider it.

In order to attain the above object, the method of controlling the normal direction of the main shaft of the numerical control machine tools of this invention according to claim 1 is characterized in that a tool is mounted to the tip of the rotatable main shaft, and at least the rotation angle of said main shaft is controlled so that the edge of said tool is always maintained at the right angle against the direction of the tool movement on the machining program locus, when a work is machined with the edge of the tool in the state that the edge of the tool is offset from the rotation center of said main shaft.

According to the method of controlling the normal direction of the main shaft of the numerical control machine tools of the invention of claim 1, when a work is machined with the edge of the tool, even if the tool is mounted to the main shaft in a state that the edge of the tool is offset from the rotation center of the main shaft, there is provided a control function to control at least the rotation angle of the main shaft so that the edge of the tool is maintained at the right angle against the direction of the tool movement on the machining program locus, whereby since the edge of the tool is always maintained at the right angle against the direction of the tool movement on the machining program locus to perform machining, machining is easily performed and a certain face accuracy is obtained. Furthermore, the operator does not have to consider that the edge of the tool is offset against the rotation center of the main shaft.

DESCRIPTION OF THE PREFERRED EMBODIMENTS

The embodiment of the present invention will now be described in detail with reference to accompanying drawings.

Before a concrete embodiment of the present invention is described, a spring tool machining will be first described as one example of machining forms using the method of controlling the normal direction of the main shaft.

Figure 4A:
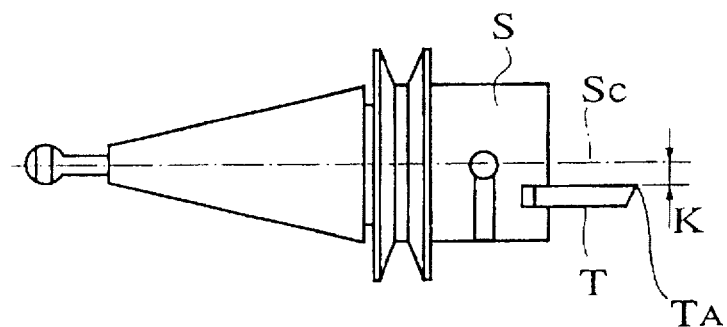
FIG. 4A is a side view of the main shaft mounted with a spring tool.
Figure 4B:
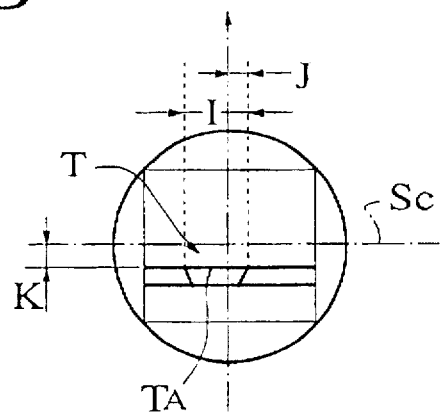
FIG. 4B is a front view of FIG. 4A.

As shown in FIGS. 4A and 4B, a spring tool T as a tool is offset against the rotation center line Sc of the main shaft S at the tip of the main shaft S. Namely, in FIGS. 4A and 4B, I, J and K show the offset value from the rotation center line Sc of the main shaft S to the edge $T_A$ of the spring tool T. Incidentally, for convenience' sake, the offset value toward the side along the program locus against the rotation center line Sc of the main shaft is assumed to be I, and the offset value toward the opposite side is assumed to be J.

Figure 5:
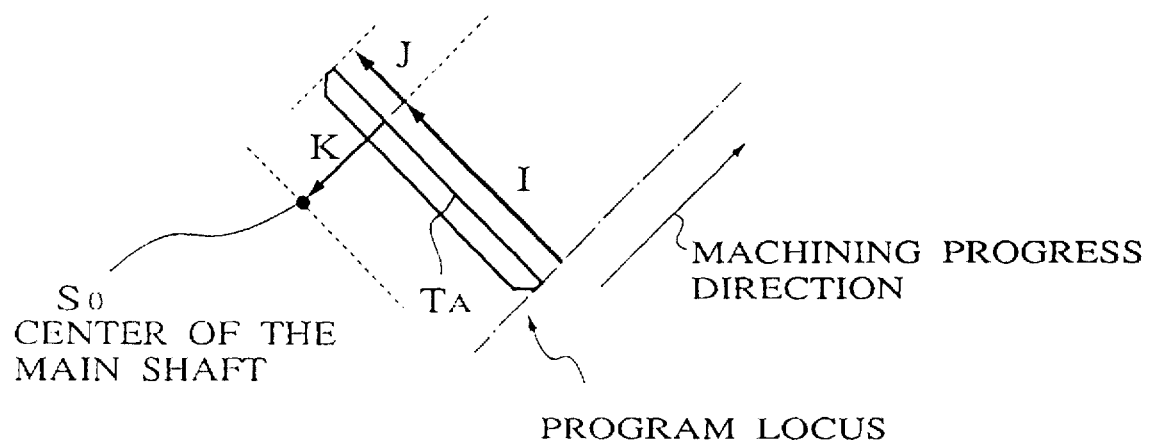
FIG. 5 is a view for illustrating the relation between the edge of the tool which is offset from the center of the main shaft, program locus and the direction of the tool movement.

Then, as described in FIGS. 4A and 4B, the offset vector from the program locus to the center point $S_O$ of the main shaft S (shaft control object point) is defined to be as shown in FIG. 5, by using a spring tool T which is offset by I, J and K against the rotation center line of the main shaft S. In FIG. 5, if the vector I, J and K are called offset vector, the size of the vector becomes |vector I|=I, |vector J|=J, and |vector K|=K.

The way to determine the offset vector at the starting point and the ending point of the block in linear interpolation and arc interpolation is the same with the calculation method of the correction vector in the correction of the tool diameter, therefore detailed description will be omitted, but what corresponds to |I+J| in FIG. 5 is the radius of the tool in the correction of the tool diameter.

Figure 6:
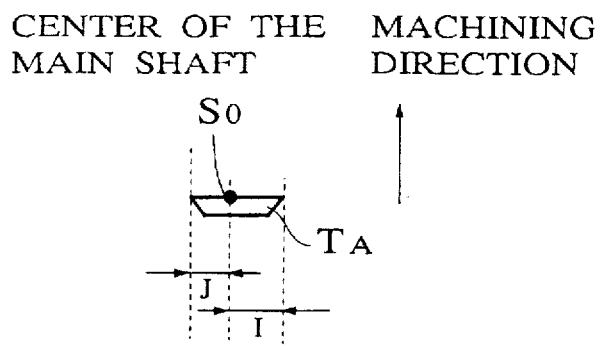
FIG. 6 is a view for illustrating the tool offset when the center of the edge of the tool is on the center of the main shaft.
Figure 7:
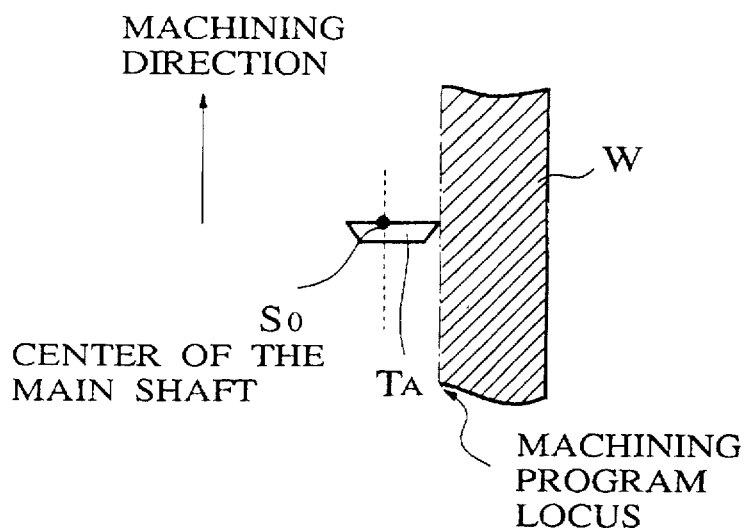
FIG. 7 is a view for illustrating the relation between the edge of the tool shown in FIG. 6 and the program locus.

In a spring tool T as shown in FIG. 6, in the case that the offset value K in the machining direction between the edge $T_A$ and the center $S_O$ of the main shaft is zero (K=0), as shown in FIG. 7, the spring tool T moves in the machining direction along the program locus in the work W to perform spring tool machining to the work W.

Thus, as shown in FIG. 7, it is necessary in order to perform the spring tool machining the work W that the center $S_O$ of the main shaft is offset to the left side by I against the program locus. In order to control the main shaft $S_O$ as such, the algorithm of the correction of the tool diameter in the conventional technique may be used.

When a linear line as shown in FIG. 7 is machined, it is not necessary to change the edge angle of the main shaft S, but even in the linear line block, when the angle of the moving direction in the block joint is changed, it is necessary to change the edge angle of the main shaft S.

When the edge $T_A$ of the spring tool T passes outside of the block joint, the offset value is calculated by the following algorithm, irrespective of the block before and behind of the joint being linear, arc or other interpolations. As one example, description will be made regarding the case where the edge follows from a linear block to a linear block.

Figure 8:
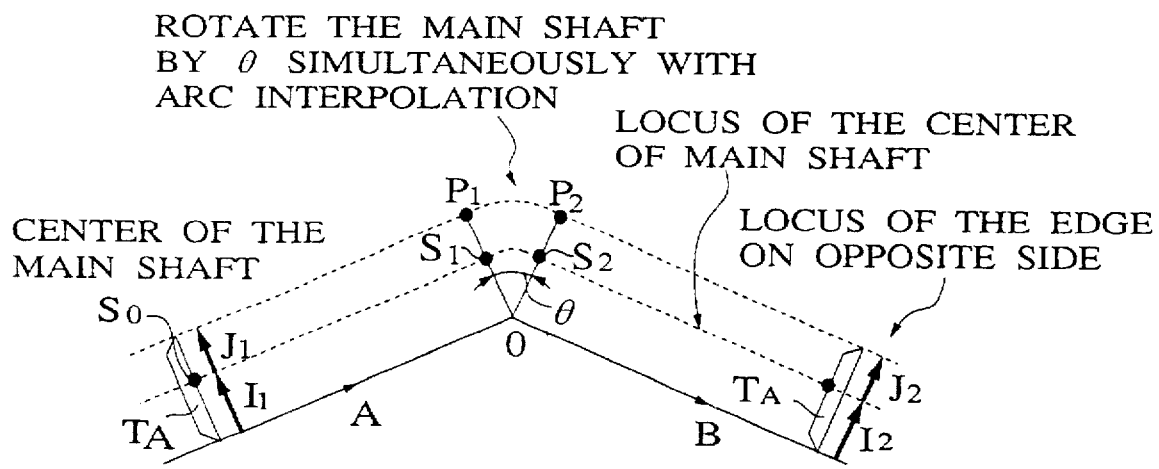
FIG. 8 is a view for illustrating the case when the edge of the tool shown in FIG. 6 passes outside of the block joint.

Namely, as shown in FIG. 8, point O is assumed to be a vector from the program coordinates origin at the command-ending point of block A, $I_1$, $J_1$ are assumed to be the offset vectors at block A and $I_2$, $J_2$ are assumed to be the offset vectors at block B.

$OP_1$ is the offset vector at the ending point of block A, and $OP_2$ is the offset vector at the starting point of block B, and since it is linear interpolation, $I_1+J_1$ equals to $I_2+J_2$, respectively. The following equations can determine Points $S_1$ and $S_2$.

$$OS_1=O+OP_1-J_1$$
$$OS_2=O+OP_2-J_2 \qquad (1)$$

The center of the main shaft $S_O$ moves to point $S_1$ by linear interpolation and then moves from point $S_1$ to point $S_2$ by arc interpolation of radius I with point O as a center. At that time, if the angle between $OP_1$ and $OP_2$ is assumed to be θ, the main shaft S rotates by θ synchronizing with the arc interpolation. Furthermore, the speed of the center of the main shaft $S_O$ is not the program-command speed F, but is determined by the following equation so that the edge of the tool on the opposite side of the program route becomes the program-command speed F.

$$\text{Center speed of main shaft}=I \times F/(I+J) \qquad (2)$$

Here, the case of linear interpolation has been described, but even in arc interpolation or other interpolations, if the offset vector at the starting point and the ending point of the block is calculated, it is possible to determine point $S_1$ and point $S_2$, thereby it is possible to control the normal direction of the main shaft at the block joint.

When the edge $T_A$ of the spring tool T passes inside of the block joint, the following algorithm can calculate the offset value, irrespective of the block before and behind of the joint being linear, arc or other interpolations. As one example, description will be made regarding the case where the edge follows from a linear block to a linear block.

Figure 9:
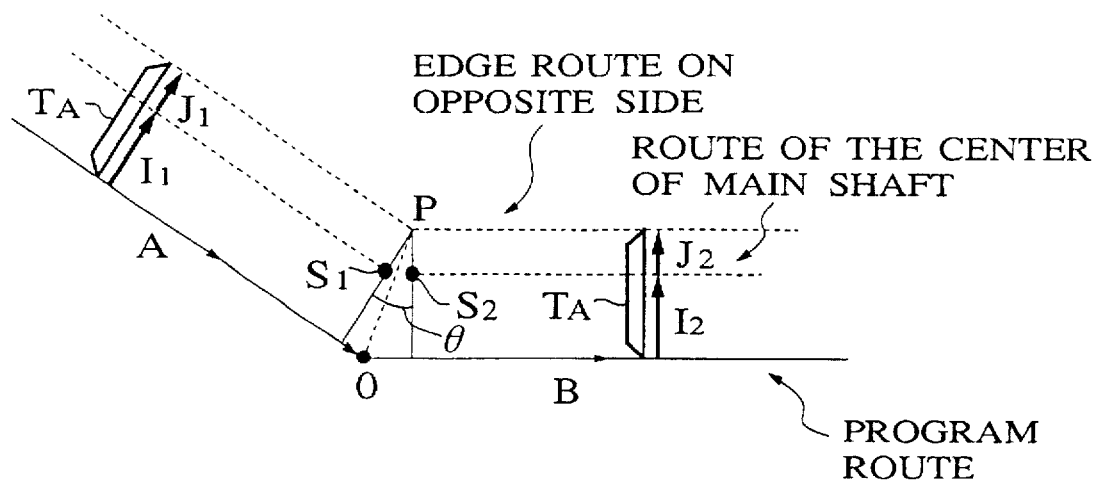
FIG. 9 is a view for illustrating the case when the edge of the tool shown in FIG. 6 passes inside of the block joint.

Namely, as shown in FIG. 9, point O is assumed to be a vector from the program coordinates origin at the command-ending point of block A, $I_1$, $J_1$ are assumed to be the offset vectors at block A and $I_2$, $J_2$ are assumed to be the offset vectors at block B.

When OP is assumed to be the vector at the intersection point for correction of the tool diameter at the block joint in the correction of the tool diameter with the spring tool T having a radius (I+J), the following equations can determine point $S_1$ and point $S_2$.

$$OS_1=O+OP-J_1$$
$$OS_2=O+OP-J_2 \qquad (3)$$

When the center of main shaft $S_O$ reaches point $S_1$, arc interpolation of the radius J from point $S_1$ to point $S_2$ is executed with point P as a center, and at the same time, the main shaft S synchronously rotates by θ. Furthermore, the center speed of the main shaft $S_O$ is not the program-command speed F, but is determined by the following equation:

$$\text{Center speed of main shaft}=I \times F/(I+J) \qquad (4)$$

Furthermore, when J=0, only the main shaft S rotates by θ.

Here, the case of linear interpolation has been described, but even in other interpolations such as arc interpolation, if the offset vector at the starting point and the ending point of the block is calculated, it is possible to determine point $S_1$ and point $S_2$, thereby it is possible to control the normal direction of the main shaft at the block joint.

There are cases where the spring tool T passes following from a linear block to an arc block, from an arc block to a linear block, or from an arc block to an arc block, but as one example, a case where the spring tool T follows from an arc block to an arc block will be described.

Figure 10:
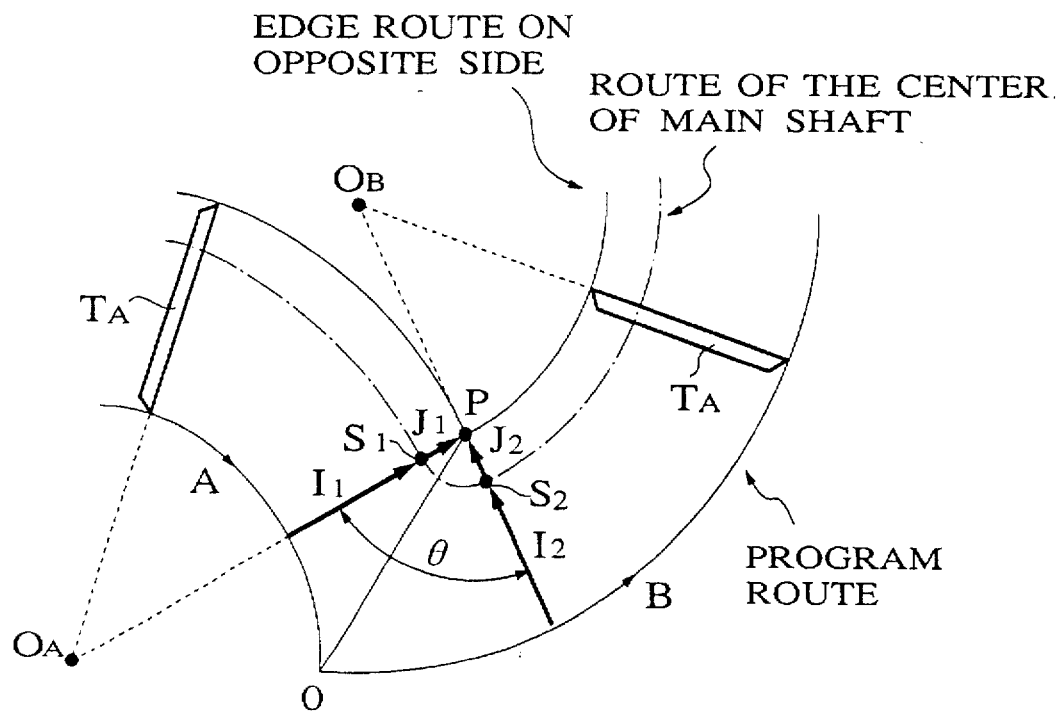
FIG. 10 is a view for illustrating the case when the edge of the tool shown in FIG. 6 passes inside following from an arc block to an arc block.

As shown in FIG. 10, point O is assumed to be a vector from the program coordinates origin at the command-ending point of block A, $I_1$, $J_1$ are assumed to be the offset vectors at point P in block A and $I_2$, $J_2$ are assumed to be the offset vectors at point P in block B, and OP is assumed to be the vector at the intersection point for correction of the tool diameter at the block joint in the correction of the tool diameter with a radius (I+J), offset vectors $I_1$ and $J_1$ at point $S_1$ is determined by the following equations:

$$I_1=|O_AP \times J/O_AP|$$

$$J_1=|O_AP \times J/O_AP| \quad (5),$$

and offset vectors $I_2$ and $J_2$ at point $S_2$ are determined by the following equations:

$$I_2=|PO_B \times J/O_BP|$$

$$J_2=|PO_B \times J/O_BP| \quad (6),$$

thereby, point $S_1$ and point $S_2$ are determined by the following equation:

$$OS_1=O+OP-J_1$$

$$OS_2=O+OP-J_2 \quad (7).$$

When the center of main shaft $S_O$ reaches point $S_1$, arc interpolation of the radius J from point $S_1$ to point $S_2$ is conducted with point P as a center, and at the same time, the main shaft S synchronously rotates by θ. Furthermore, the center speed of the main shaft is determined by the following equation:

$$\text{Center Speed of main shaft} = I \times F/(I+J) \quad (8)$$

Furthermore, when J=0, only the main shaft S rotates by θ.

Here, the case where the edge follows from an arc block to an arc block has been described, but even in other cases, if point $S_1$ and point $S_2$ are determined, it is possible to control in the normal direction at the block joint.

Figure 11:
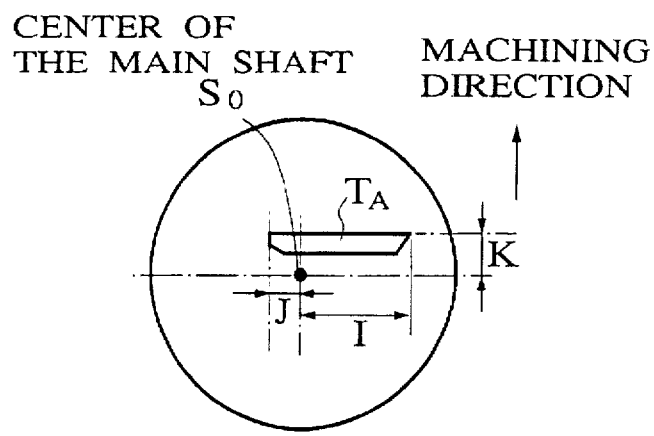
FIG. 11 is a view for illustrating the tool offset when the edge of the tool is not on the center of the main shaft.
Figure 12:
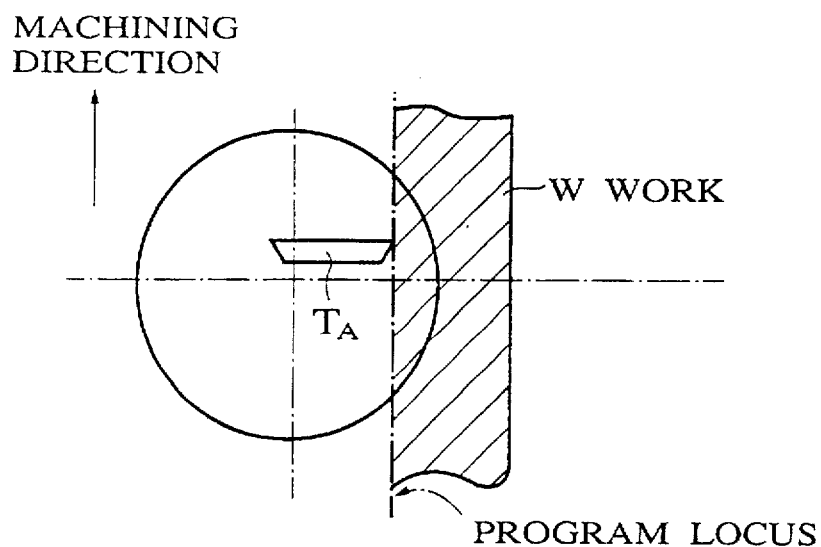
FIG. 12 is a view for illustrating the relation between the edge of the tool shown in FIG. 11 and the program locus.

FIG. 11 shows the spring tool T, in which the offset between the edge $T_A$ and the center of main shaft $S_O$ is assumed to be K. In this case, as shown in FIG. 12, the spring tool T moves along the program locus and planes the work W with the edge $T_A$ of the spring tool T. In this situation, it is possible to offset the center of main shaft $S_O$ by I against the program locus in the work W, as already described in FIG. 7, by utilizing algorithm of the correction of tool diameter which is the conventional technique, however, other way of thinking should be added to offset the center of main shaft $S_O$ by K in the direction of the tool movement. In this case, it is necessary to control the position in the center of main shaft $S_O$ and the edge angle of main shaft θ. The way to determine the position and the angle thereof will be described below.

When the edge of the spring tool T passes outside of the block joint, the offset value is calculated by the following algorithm, irrespective of the block before and behind of the joint being linear, arc or other interpolations. As one example, description will be made regarding the case where the edge follows from a linear block to a linear block.

Figure 13:
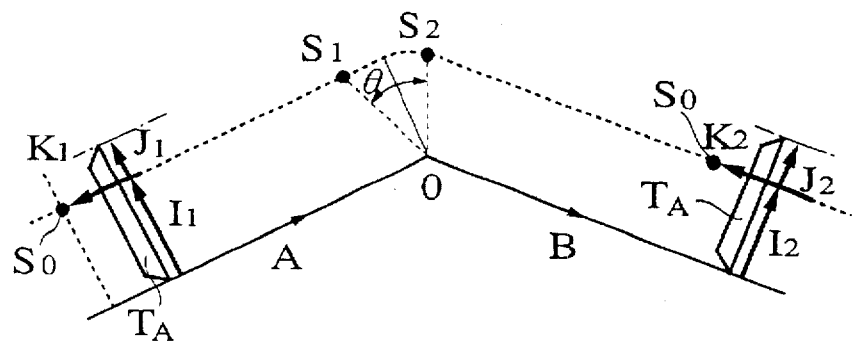
FIG. 13 is a view for illustrating the case when the edge of the tool shown in FIG. 11 passes outside of the block joint.

Namely, as shown in FIG. 13, point O is assumed to be a vector from the program coordinates origin at the command-ending point of block A, $I_1$, $J_1$ and $K_1$ are assumed to be the offset vectors at block A and $I_2$, $J_2$ and $K_2$ are assumed to be the offset vectors at block B.

$$OS_1=O+I_1+K_1$$

$$OS_2=O+I_2+K_2 \quad (9)$$

When the center of main shaft $S_O$ moves from point $S_1$ to point $S_2$ determined by $OS_1$ and $OS_2$ by the arc interpolation of the radius $|OS_1|$ with point O as a center, and at the same time, the main shaft S rotates by the angle θ synchronously, the tool edge $T_A$ of the spring tool T is to rotate the corner with point O as a center.

Furthermore, the speed of the center of main shaft $S_O$ is not the program-command speed F, but is determined by the following equation so that the edge of the tool on the opposite side of the program route becomes the program-command speed F.

$$\text{Center speed of main shaft} = F \times \sqrt{I^2+K^2}/(I+J) \quad (10)$$

Here, the case of linear interpolation has been described, but even in other interpolations such as arc interpolation, if the offset vector at the starting point and the ending point of the block are calculated, it is possible to determine point $S_1$ and point $S_2$, thereby it is possible to control in the normal direction at the block joint.

When the edge of the spring tool T passes inside of the block joint, the offset value is calculated by the following algorithm, irrespective of the block before and behind of the joint being linear, arc or other interpolations. As one example, description will be made regarding the case where the edge follows from a linear block to a linear block.

Figure 14:
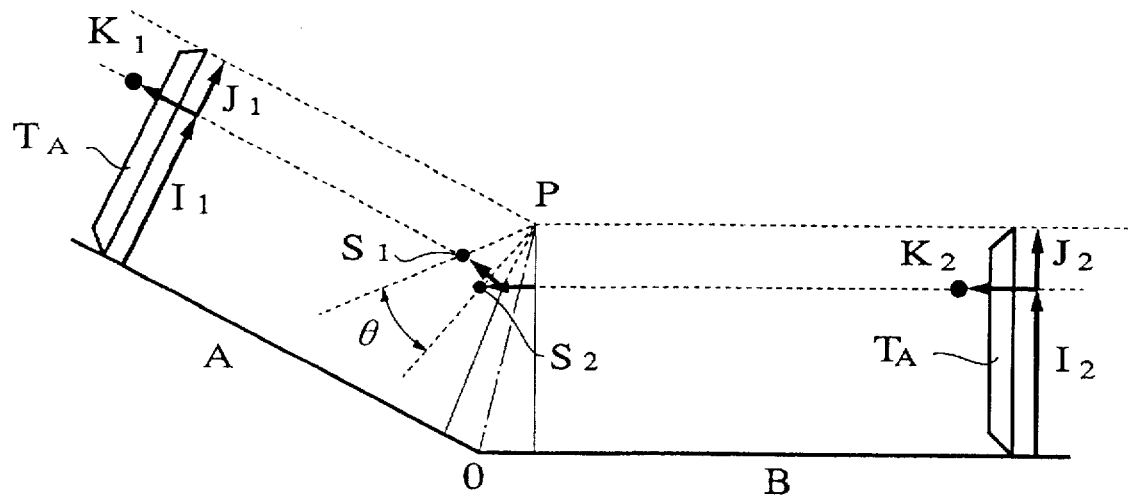
FIG. 14 is a view for illustrating the case when the edge of the tool shown in FIG. 11 passes inside of the block joint.

Namely, as shown in FIG. 14, point O is assumed to be a vector from the program coordinates origin at the command-ending point of block A, $I_1$, $J_1$ and $K_1$ are assumed to be the offset vectors at block A and $I_2$, $J_2$ and $K_2$ are assumed to be the offset vectors at block B.

When OP is assumed to be the vector at the intersection point for correction of the tool diameter at the block joint in the correction of the tool diameter with the spring tool T having a radius (I+J), point $S_1$ and point $S_2$ are determined by the following equations:

$$OS_1=O+OP-J_1+K_1$$

$$OS_2=O+OP-J_2+K_2 \quad (11)$$

When the center of main shaft $S_O$ reaches point $S_1$, arc interpolation of the radius $\sqrt{J^2+K^2}$ from point $S_1$ to point $S_2$ is executed with point P as a center, and at the same time, the main shaft S synchronously rotates by θ. Furthermore, the speed of the main shaft center $S_O$ is not the program-command speed F, but is determined by the following equation:

$$\text{Center speed of main shaft} = \sqrt{(J^2+K^2)} \times F/(I+J) \quad (12)$$

Furthermore, when J=0, only the main shaft S rotates by θ.

Here, the case of linear interpolation has been described, but even in other interpolations such as arc interpolation, if the offset vector at the starting point and the ending point of the block are calculated, it is possible to determine point $S_1$ and point $S_2$, thereby it is possible to control the normal direction at the block joint.

There are cases where the spring tool T passes following from a linear block to an arc block, from an arc block to a linear block, or from an arc block to an arc block, but as one example, a case where the spring tool T follows from an arc block to an arc block will be described.

Figure 15:
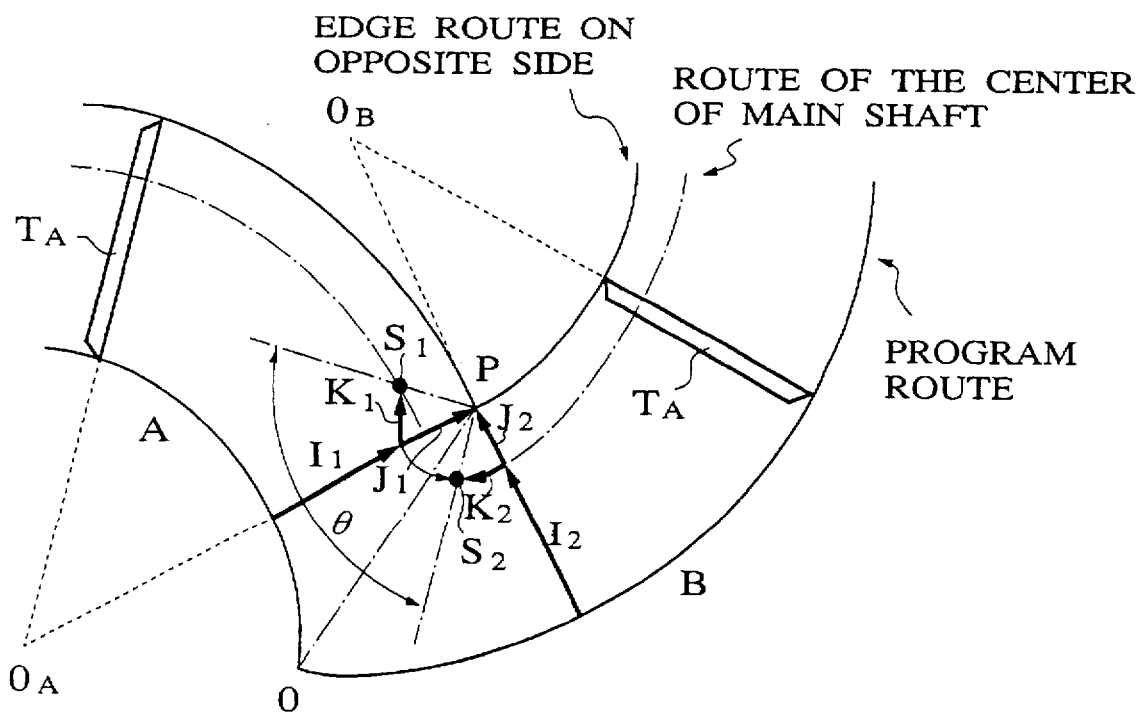
FIG. 15 is a view for illustrating the case when the edge of the tool shown in FIG. 11 passes inside following from an arc block to an arc block.

As shown in FIG. 15, point O is assumed to be a vector from the program coordinates origin at the command-ending point of block A, $I_1$, $J_1$ and $K_1$ are assumed to be the offset vectors at point P in block A and $I_2$, $J_2$ and $K_2$ are assumed to be the offset vectors at point P in block B, and OP is assumed to be the vector at the intersection point for correction of the tool diameter at the block joint in the correction of the tool diameter having a radius (I+J), offset vectors $I_1$, $J_1$ and $K_1$ at point $S_1$ are determined by the following equations:

$$I_1=|O_AP \times J/O_AP|$$

$$J_1=|O_AP \times J/|O_AP|| \quad (13),$$

$$K_1=|O_AP \times K/|O_AP||$$

provided that $K_1$ is the one obtained by rotating $K_1'$ by 90 degree, and offset vectors $I_2$, $J_2$ and $K_2$ at point $S_2$ are determined by the following equations:

$$I_2=|PO_B \times J/|O_BP||$$

$$J_2=|PO_B \times J/|O_BP|| \quad (14),$$

$$K_2=|PO_B \times K/|O_BP||$$

provided that $K_2$ is the one obtained by rotating $K_2'$ by 90 degree, thereby, point $S_1$ and point $S_2$ are determined by the following equations:

$$OS_1=O+OP-J_1+K_1$$

$$OS_2=O+OP-J_2+K_2 \quad (15).$$

When the center of main shaft $S_0$ reaches point $S_1$, arc interpolation of the radius $\sqrt{(J^2+K^2)}$ from point $S_1$ to point $S_2$ is executed with point P as a center, and at the same time, the main shaft S synchronously rotates by θ. Furthermore, the center speed of the main shaft is determined by the following equation:

$$\text{Center Speed of main shaft} = F \times \sqrt{(J^2+K^2)} \,/(l+J)\ldots \quad (16)$$

Furthermore, when J=0, only the main shaft S rotates.

Here, the case where the edge follows from an arc block to an arc block has been described, but even in other cases, if point $S_1$ and point $S_2$ are determined, it is possible to control the normal direction of the main shaft at the block joint.

Figure 2:
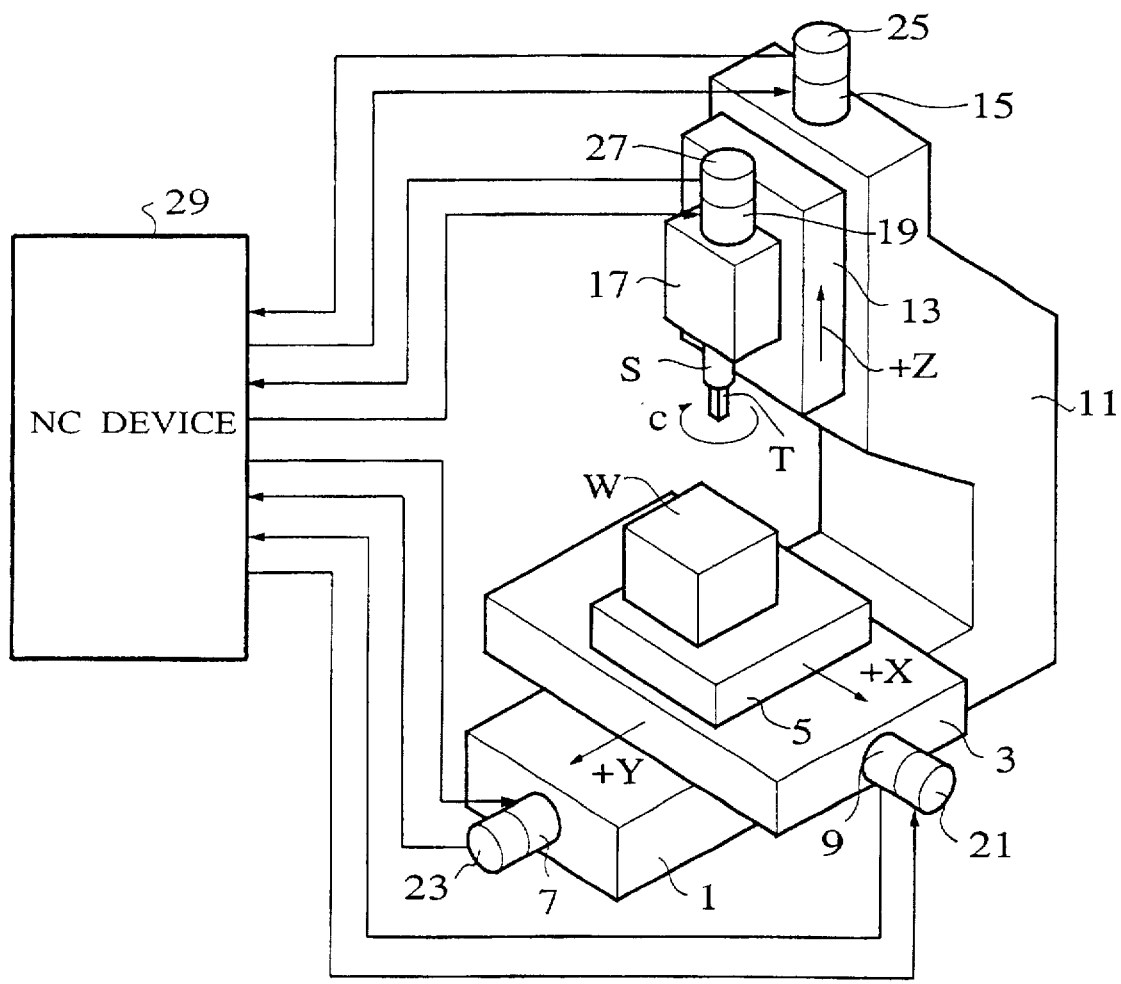
FIG. 2 is a schematic perspective view showing one embodiment of the numerical control machine tool used for performing the method of controlling the normal direction of the main shaft of the present invention.

One embodiment of the numerical control machine tools which execute the method of controlling the normal direction of the main shaft of the present invention is shown in FIG. 2. Namely, in FIG. 2, the numerical control machine tool comprises a bed 1, a Y-axis table 3 mounted movably in the Y-axis direction on the bed 1, and an X-axis table 5 mounted movably in the X-axis direction on the Y-axis table 3, and a work W is fixedly placed on the X-axis table 5. The Y-axis table 3 is driven in the Y-axis direction by a Y-axis servomotor 7, and the X-axis table 5 is driven in the X-axis direction by an X-axis servomotor 9, and the work W on the X-axis table 5 is axially controlled to an optional coordinates position by X coordinates and Y coordinates along the horizontal plane by X axis and Y axis, by the movement in the Y-axis direction of the Y-axis table 3 by means of the Y-axis servomotor 7 and the movement in the X-axis direction of the X-axis table 5 by means of the X-axis servomotor 9.

A Z-axis slider 13 is mounted movably in the vertical direction, that is, in the Z-axis direction to the column 11 of the numerical control machine tool, and the Z-axis slider 13 is driven in the Z-axis direction by a Z-axis servomotor 15.

A main shaft head 17 is mounted to the Z-axis slider 13, and the main shaft S is mounted to the main shaft head 17 rotatably in the periphery of axis in the same direction with Z axis, that is, in the periphery of C axis.

The main shaft S is rotatably driven by the C-axis servomotor 19 which is the main shaft motor, as well as the rotation angle of C axis is controlled quantitatively, and to the main shaft S is mounted, for example, a spring tool T as a tool.

Here, the moved plane of the work W by X axis and Y axis is a plane orthogonal to the rotation axis of the main shaft S, that is, C axis (Z axis).

To the X-axis servomotor 9, the Y-axis servomotor 7, the Z-axis servomotor 15, and the C-axis servomotor 19, there are mounted rotary encoders 21, 23, 25 and 27, respectively, and these rotary encoders 21, 23, 25 and 27 detect the rotation angle of the servomotors 9, 7, 15 and 19 of respective axes to output the information of the rotation angle to the NC device 29.

Figure 3:
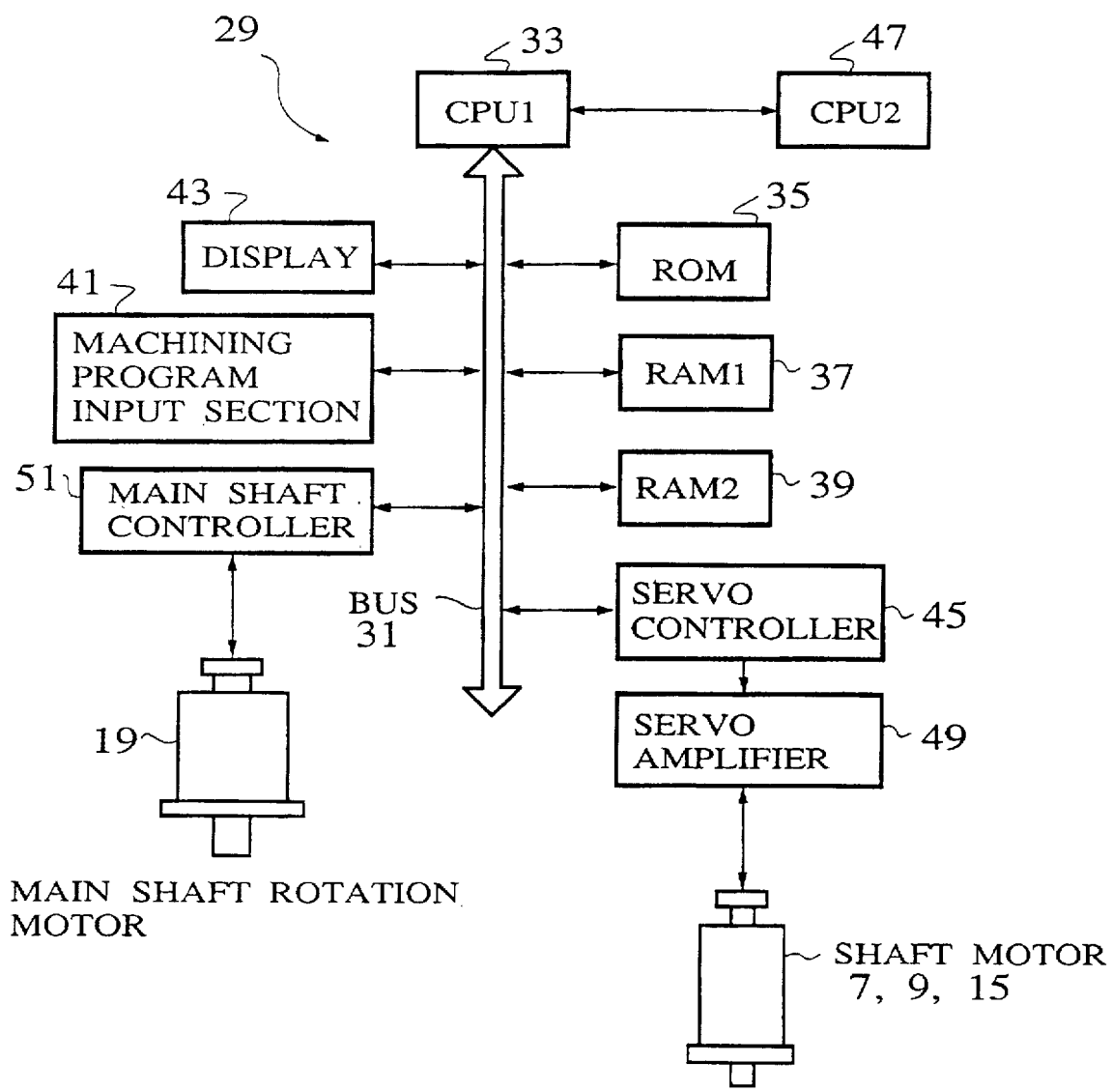
FIG. 3 is a block diagram showing the control system of the numerical control machine tool used for performing the method of controlling the normal direction of the main shaft of the present invention.

Said NC device 29 has, as shown in FIG. 3, a main processor (CPU1) 33, ROM 35, RAM 37 and 39, a machining program input section 41, a display 43 and a servo controller 45 which are mutually connected by a bus 31. Furthermore, for high speed processing, a subprocessor (CPU2) 47 is directly connected to the main processor 33. ROM 35 stores the system program, RAM 37 functions as a temporary data storing memory, and RAM 39 stores machining programs, tool data and the like input from the machining program input section 41. To the servo controller 45, there are connected servo amplifiers 49 of respective axes, and to the servo amplifiers 49, there are connected servomotors 7, 9 and 15 of respective axes. Furthermore, to said bus 31 is connected a main shaft controller 51 for controlling the servomotor 19 of C axis.

Said display 43 is to display necessary data for machining, such as machining program under practice, coordinates of machine position and the like. Furthermore, the main shaft controller 51 outputs the speed from the main processor 33 to read out the feedback of the main shaft position, in order to control the angle (θ) of the main shaft S to maintain always certain angle with the progress direction of the machining program, by controlling the normal direction in the main shaft S.

Figure 1:
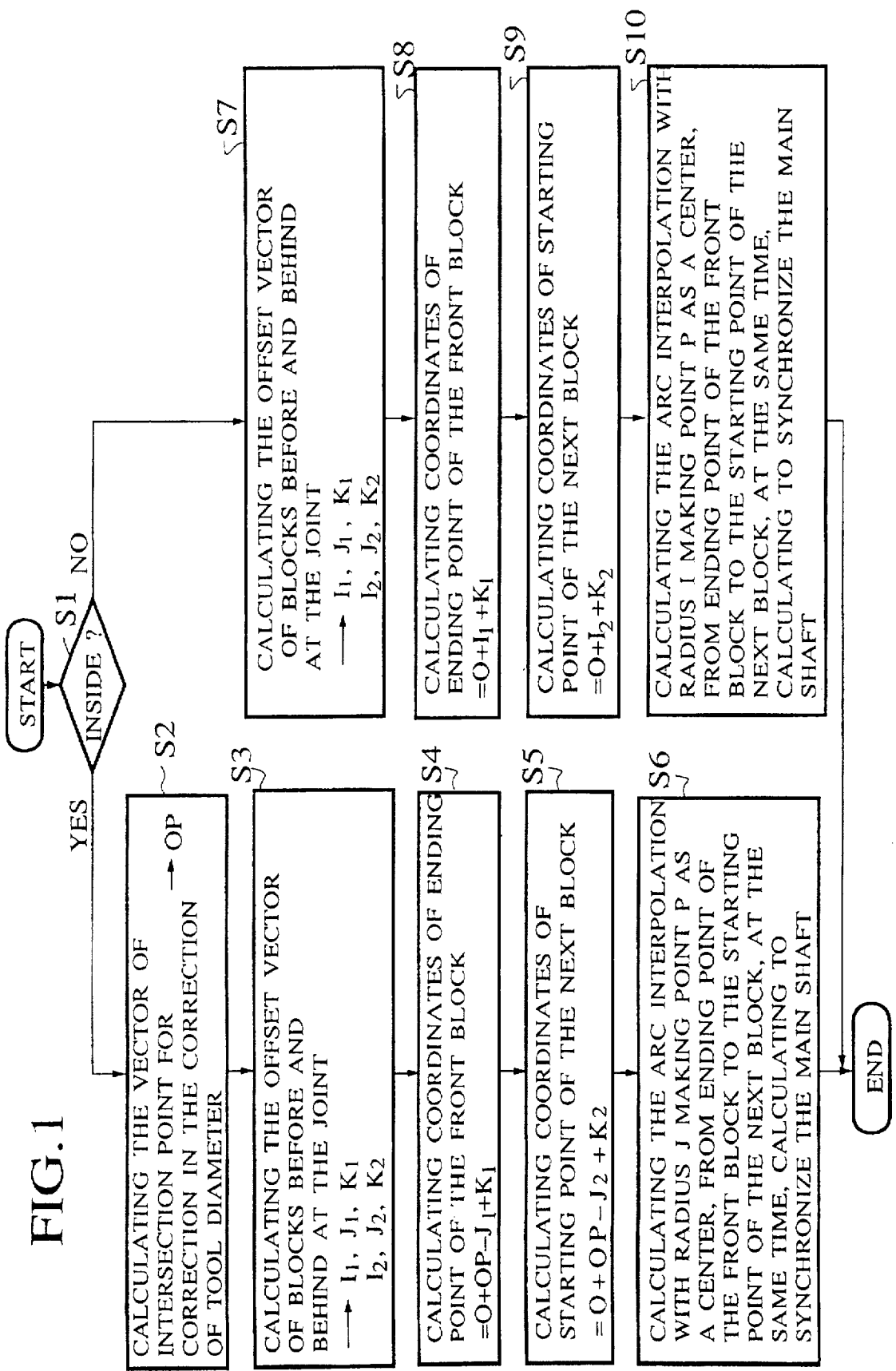
FIG. 1 is a flow chart for illustrating the analytic operation at the block joint during the mode controlling the normal direction of the main shaft according to the present invention.

The analysis operation at the block joint during the control mode in the normal direction of the main shaft will be described with reference to the structure described above, based on the flow chart shown in FIG. 1. First, machining program is read out to analyze one block each from RAM 39. During controlling the normal direction of the main shaft S, since the way to calculate the offset vector is different depending upon whether the center of main shaft $S_0$ passes inside or outside, according to the situation at the joint from two blocks before and behind, at step $S_1$, it is judged whether the center of main shaft $S_0$ passes inside or not.

When it is judged that the center of main shaft $S_0$ passes inside, the step $S_2$ is started, and the vector OP of intersection for correction is calculated in the correction of the tool diameter. Then at step S3, the offset vectors $I_1$, $J_1$, $K_1$:$I_2$, $J_2$, $K_2$ of the block before and behind at the joint are calculated. At step S4, the coordinates at the ending point of the correction locus of the front block is calculated with, for example, equation 11:$OS_1=O+OP-J_1+K_1$. The coordinates obtained here becomes the ending point of the center of main shaft $S_0$ which is the result of the correction of the front block A.

At step S5, the coordinates of the ending point of the correction locus of the next block is calculated with, for example, equation 1-1:$OS_2=O+OP-J_2+K_2$. The coordinates obtained here becomes the ending point of the center of main shaft $S_0$ which is the result of the correction of the next block B. At step S6, arc interpolation is executed from the ending point of the correction locus of front block to the ending point of the correction locus of the next block, and calculation for rotating the main shaft S by θ synchronously therewith is executed.

In the case when it is judged that the center of main shaft $S_0$ passes not inside but outside at said step $S_1$, the step S7 is started, and the offset vectors $I_1$, $J_1$, $K_1$:$I_2$, $J_2$, $K_2$ of the block before and behind at the joint are calculated. At step S8, the coordinates at the ending point of the correction locus of the front block are calculated with, for example, equation 9:$OS_1=O+I_1+K_1$.

At step S9, the coordinates of the correction locus of the starting point of the next block are calculated with equation 9:$OS_2=O+I_2+K_2$. The coordinates obtained here becomes the ending point of the center of main shaft $S_0$ which is the result of the correction of the next block B. At step S10, arc interpolation is executed from the ending point of the correction locus of the front block to the ending point of the correction locus of the next block, and calculation for rotating the main shaft S synchronously therewith is executed.

By moving the center of the tool in the locus of the obtained center of the tool, and at the same time by synchronizing the main shaft S, even if the edge of the tool $T_A$ is offset against the center of main shaft $S_0$, the operator can perform the spring tool machining easily without considering it. Moreover, when only the main shaft S rotates at the block joint, one of the sides of the tool edge does not move to the reverse direction to the moving direction of the tool, and the tip speed of the tool edge becomes the speed instructed by the program, whereby certain face accuracy can be obtained.

In addition, the present invention is not restricted to the embodiment described above, and by performing proper changes, it is possible to conduct the present invention with other embodiments. In this embodiment, a case in which a spring tool is used as a tool has been described, but it is also possible to apply for the case in which the edge of usual cutting tools is offset against the center of main shaft $S_0$. Moreover, in the description of the preferred embodiment, only linear interpolation and arc interpolation are explained, but if the offset vector between each block is determined, it is possible to control accurately in the normal direction of the main shaft.

As is understood from the above description of the embodiment, according to the present invention according to claim 1, when a work is machined with the edge of a tool, even if the tool is mounted to the main shaft in a state that the edge of the tool is offset from the rotation center of the main shaft, since there is a control function provided thereto to control the rotation angle of at least the main shaft so that the edge of the tool is maintained at the right angle against the direction of the tool movement on the machining program locus, the edge of the tool is always maintained at the right angle against the direction of the tool movement on the machining program locus to machine a work, whereby the work is machined easily, and the operator can machine a work without considering that the edge of the tool is offset against the rotation center of the main shaft.

Furthermore, even in the case when only the main shaft rotates at the block joint, one of the sides of the tool edge does not move to the reverse direction to the machining direction of the tool thereof, and the tip speed of the tool edge becomes the speed instructed by the program, whereby certain face accuracy can be obtained.

What is claimed is:

1. A method of controlling a rotational angle of a main shaft of a numerically controlled machine tool including a main shaft having a center axis about which a rotational angle of the main shaft is adjustable and a spring tool mounted on a tip of the main shaft, generally parallel to the center axis, and having an edge offset from the center axis of the main shaft, wherein the spring tool moves along a locus to be described by a machining program relative to a work and planes a surface of the work with the edge of the spring tool, the locus being turned, comprising the step of:

controlling the rotational angle about the center axis of the main shaft so that the edge of the spring tool is maintained at a right angle to a direction of the tool movement along the locus to be described by the machining program relative to the work, when the edge of the spring tool planes the work.

2. A numerically controlled machine tool for machining a surface of a work along a locus to be described by a machining program, the locus being turned, comprising:

a main shaft having a tip and a center axis about which a rotational angle of the main shaft is adjustable; and a spring tool having an edge, the spring tool being mounted on the tip of the main shaft, generally parallel to the center axis, and having the edge offset from the center axis of the main shaft, the spring tool being movable along the locus to be described by the machining program relative to the work and configured to plane the surface of the work with the edge;

wherein the rotational angle about the center axis of the main shaft is controlled so that the edge of the spring tool is maintained at a right angle to a direction of the tool movement along the locus to be described by the machining program relative to the work, when the edge of the spring tool planes the work.

* * * * *